United States Patent [19]

Penningroth et al.

[11] 4,065,719

[45] Dec. 27, 1977

[54] DIAGNOSTIC CONNECTION MEANS FOR VEHICLE MOUNTED RADIO

[75] Inventors: Herbert M. Penningroth; James H. Guyton, both of Kokomo, Ind.

[73] Assignee: General Motors Corporation, Detroit, Mich.

[21] Appl. No.: 742,051

[22] Filed: Nov. 15, 1976

[51] Int. Cl.² .............................................. H04B 17/00
[52] U.S. Cl. .............................. 325/312; 324/158 R; 325/363; 343/711
[58] Field of Search .................. 325/67, 133, 312, 363; 343/702, 711; 324/72.5, 73 R, 149, 158 R, 158 P

[56] References Cited

U.S. PATENT DOCUMENTS 3,467,867  9/1969  Armes et al. ............................ 325/363

*Primary Examiner*—Benedict V. Safourek
*Assistant Examiner*—Marc E. Bookbinder

*Attorney, Agent, or Firm*—Robert M. Sigler

[57] ABSTRACT

In a vehicle mounted radio having a case enclosing antenna trimmer adjustment means with a trimmer adjustment screw accessible through openings in the case and front escutcheon, an insulated tube extends from the trimmer adjustment screw through the case opening. A plurality of electrical contacts within the tube between case and escutcheon have terminal means for connection to active portions of the radio circuitry. A similar contact in the tube within the case has terminal means for connection to the antenna terminal. The tube is effective to receive and guide an adjusting tool to the trimmer adjustment screw or, alternatively, to receive a test probe with a contact adapted to engage the recessed contacts in the tube alternatively by rotation and axial translation through the tube. The antenna contact is shielded from the others by the radio case.

2 Claims, 8 Drawing Figures

DIAGNOSTIC CONNECTION MEANS FOR VEHICLE MOUNTED RADIO

BACKGROUND OF THE INVENTION

In the diagnosis and repair of vehicle mounted radios, it is often discovered that the faulty portion of the radio system is the antenna, speakers or power supply outside the radio case. This is sometimes discovered after much unnecessary work has been expended removing the radio from the car dash. It would be helpful to vehicle repair personnel if connection means were provided in vehicle mounted radios whereby the elements of the radio system external to the case could be tested prior to removal of the case from the vehicle dash.

SUMMARY OF THE INVENTION

This invention relates to diagnostic connection means for a vehicle mounted radio. This connection means comprises a test jack incorporated with the antenna trimmer adjustment means which is accessible from the front of the radio case in most vehicle mounted radios. A non-conducting tube extends from the trimmer adjustment screw through the front of the case and a plurality of recesssed contacts are disposed in the tube so that they will not be contacted by a trimmer adjustment tool inserted through the tube but may be contacted by a test probe. Each of the contacts has a terminal connected to some portion of the radio circuitry, the contact connected to the antenna being within the case and the contacts connected with active portions of the radio circuitry being outside the case and therefore shielded from the antenna circuitry. The tube is adapted to receive a test probe with a contact engageable with each of the tube contacts in turn by rotation or axial movement.

Further details and advantages of this invention will be apparent from the accompanying drawings and following description of a preferred embodiment.

DESCRIPTION OF THE PREFERRED EMBODIMENT

Figure 1:
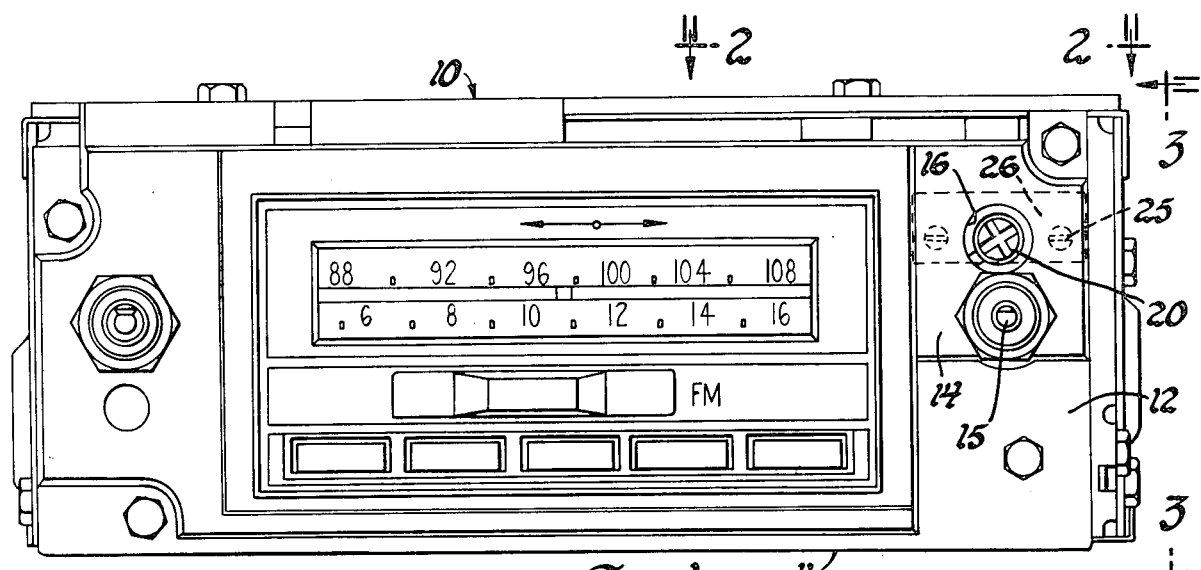
FIG. 1 shows a front view of a radio suitable for mounting in a vehicle dash.

Referring to FIG. 1, a radio 10 is adapted for mounting in the dash of a motor vehicle. Radio 10 has a case 11 enclosing conventional electrical radio circuitry, not shown, and having a front plate 12. In front of front plate 12, an escutcheon 14 covers the mechanical band and station selector apparatus. Front plate 12 and escutcheon 14 are commonly stamped from metal such as sheet steel.

Figure 2:
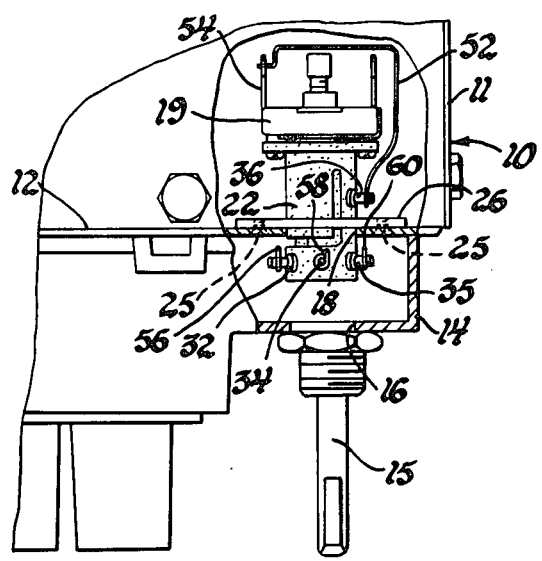
FIG. 2 shows a partial cutaway view along lines 2—2 in FIG. 1.
Figure 3:
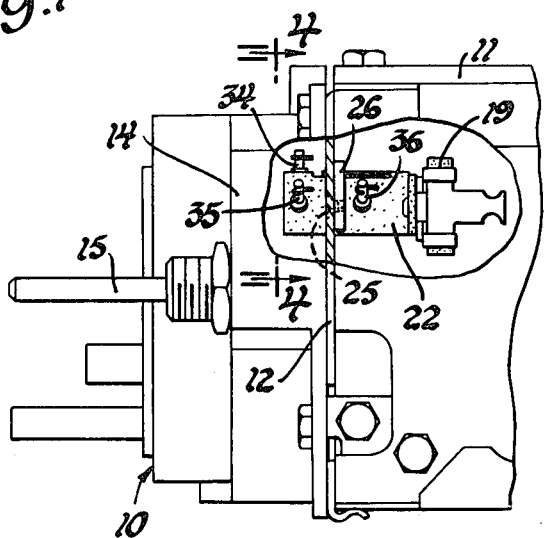
FIG. 3 shows a partial cutaway view along lines 3—3 in FIG. 1.

A station selector shaft 15 projects outward through front plate 12 and escutcheon 14 on the right side of the front of radio 10 in FIG. 1. Directly above shaft 15, as shown in FIGS. 1 and 2, are an opening 16 in escutcheon 14 and an opening 18 in front plate 12. Antenna trimmer adjustment means 19, shown in FIGS. 2 and 3, is ordinarily, in the prior art, mounted just inside front plate 12 with an antenna trimmer adjustment screw 20 disposed in line with openings 16 and 18 to be accessible to a screwdriver or similar tool from the front of radio 10. The location of trimmer adjustment screw 20 is reasonably consistent in vehicle radios and the openings 16 and 18 provide access to the internal circuitry of radio 10 from the front while radio 10 is mounted in a vehicle dash.

Figure 5:
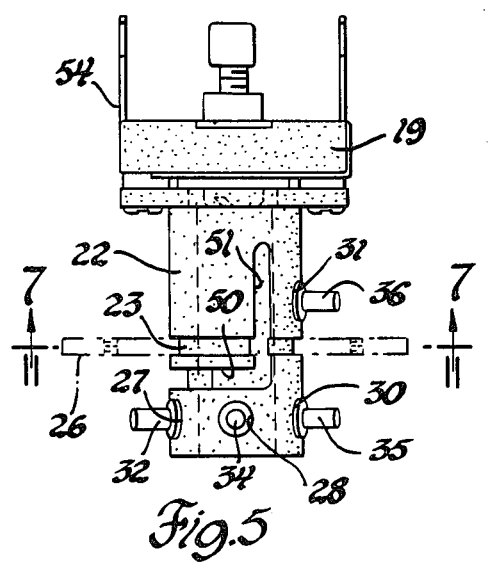
FIG. 5 shows a view along lines 5—5 in FIG. 4.
Figure 8:
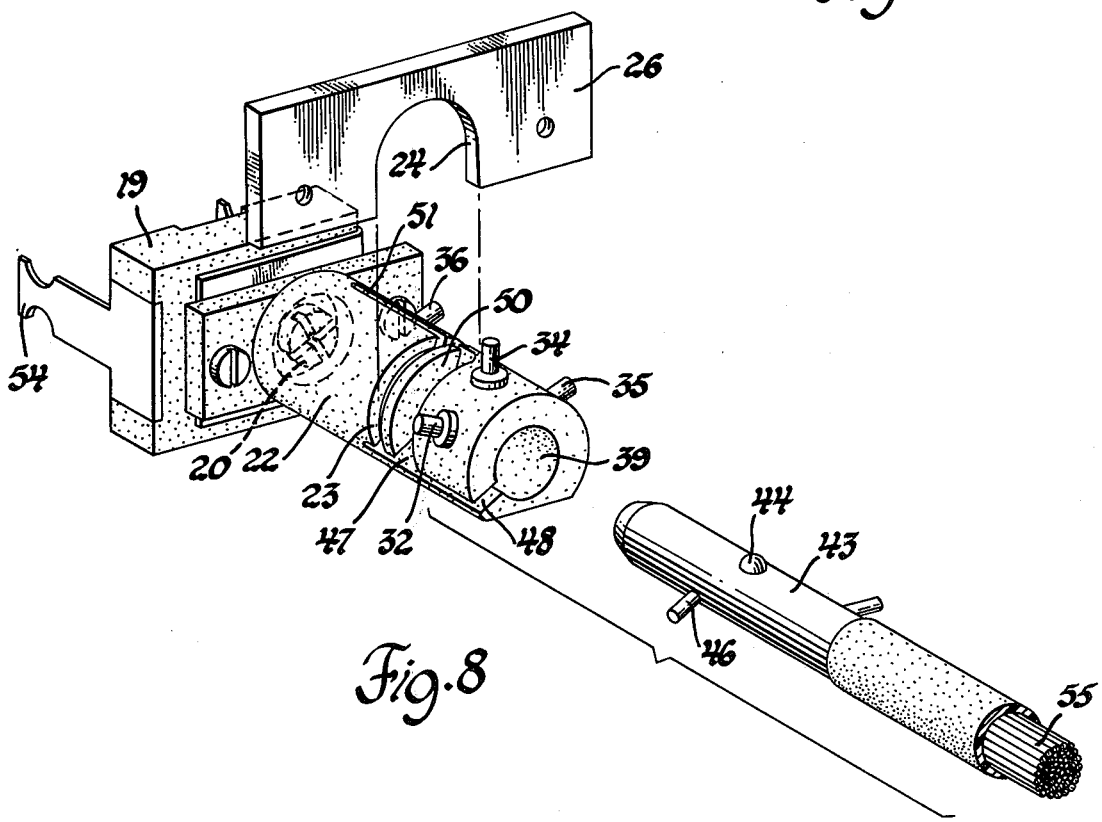
FIG. 8 shows an exploded view of apparatus according to this invention for use in the radio of FIG. 1.

In this embodiment of the invention, antenna trimmer adjustment means 19 is mounted on the end of an insulated tube 22, as shown in FIGS. 2 and 5. Tube 22 has a circumferential groove 23 therearound, as shown in FIG. 5, which engages the open slot 24 of a mounting plate 26, as seen in FIG. 8. Mounting plate 26 is attached to the inside of front plate 12 by a pair of screws 25 as seen in FIGS. 1-3. Tube 22 is thus disposed projecting through opening 18 in line with opening 16 and supporting antenna trimmer adjustment means 19 within case 11. Tube 22 provides access to trimmer adjustment screw 20 from the front of radio 10 and, in fact, may serve as a guide to trimmer adjustment screw 20 for a screwdriver or similar tool.

Figure 4:
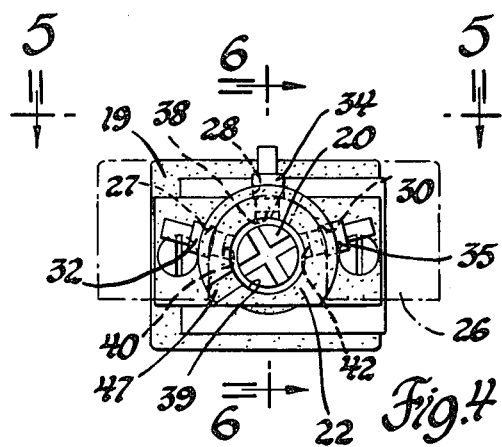
FIG. 4 shows a view along lines 4—4 in FIG. 3.
Figure 6:
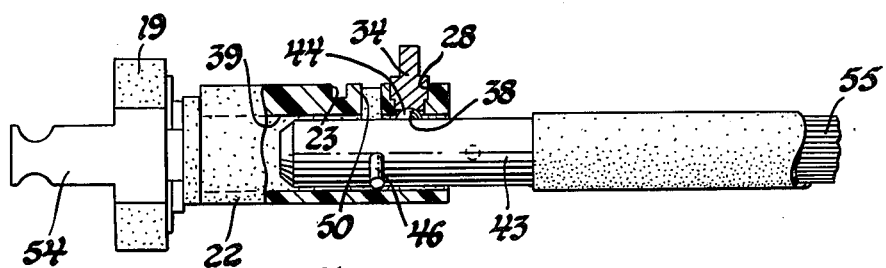
FIG. 6 shows a view along lines 6—6 in FIG. 4, modified by the inclusion of a test probe in one of its test positions.
Figure 7:
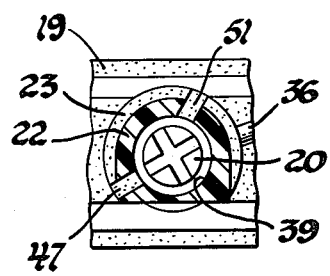
FIG. 7 shows a view along lines 7—7 in FIG. 5.

Tube 22 is provided with a plurality of radial openings 27, 28, 30 and 31 as shown in FIGS. 4, 5 and 6. Terminal contact members 32, 34, 35 and 36 are disposed in openings 27, 28, 30 and 31, respectively. Opening 28 and terminal contact member 34 are shown in cutaway in FIG. 6. It can be seen that terminal contact member 34 projects radially outward from opening 28 and defines a contact 38 at its radial inner end which is recessed from the inner surface 39 of tube 22. Terminal contact members 32 and 35 similarly define recessed contacts 40 and 42, respectively, as shown in FIG. 4; while terminal contact member 36 defines a similar contact, not shown.

FIGS. 6 and 8 show a probe adapted to be inserted axially within tube 22 and selectively contact terminal contact members 32, 34, 35 and 36. Probe 43 includes a radially reciprocable outward biased contact 44 effective, when radially aligned with, for example, opening 28, to spring outwardly against contact 38 of terminal contact member 34. Contact 44 is similarly capable of engaging any of the other terminal contact members 32, 35 and 36 with proper axial and rotational positioning of probe 43.

For assistance to the operator of test probe 43, an aligning finger 46 is provided which projects radially outward from probe 43; and a guiding channel 47 in tube 22 is adapted to receive finger 46. Guiding channel 47 has a first axial portion 48 of such length and orientation that insertion of probe 43 will bring contact 44 into engagement with terminal contact member 32. A circumferential portion 50 of channel 47 allows probe 43 to be rotated until contact 44 first engages terminal contact member 34 and then terminal contact member 35. A second axial portion 51 of channel 47 allows probe 43 to be moved further axially inward until contact 44 engages terminal contact member 36.

As seen in FIG. 2, a short lead 52 connects terminal contact member 36 with the antenna terminal 54 of antenna trimmer adjustment means 19. Thus, when contact 44 of probe 43 engages terminal contact member 36, conductor 55 of probe 43 is connected with the vehicle antenna means. Similarly, leads 56, 58 and 59 connect terminal contact members 32, 34 and 35, respectively, with active points in the circuitry that connect with elements outside the case, such as the left and right output audio channels and the electrical power supply. Testing means of which probe 43 is a portion can be selectively connected to any of these portions of the circuitry for test without removing radio 10 from the vehicle dash.

It can be seen that terminal contact member 36 is located on the inside of case 11, along with the antenna trimmer adjustment means 19; but terminal contact members 32, 34 and 35, which connect with active portions of the circuitry, are located outside case 11. Front plate 12 and mounting plate 26, being steel or a similarly electromagnetically shielding material, help shield terminal contact member 36 and antenna trimmer adjustment means 19 from possible electro-magnetic pickup of signals present at the other terminal contact members during radio operation. Of course, escutcheon 14 encloses the other terminal contact members 32, 34 and 35; while opening 16 allows access for probe 43 or a screwdriver to turn adjustment screw 20. The recessed contacts of the terminal contact members ensure that a screwdriver inserted in tube 22 for adjustment of the antenna will not short one terminal contact member to another.

The embodiment described above is a preferred embodiment; but equivalent embodiments will occur to those skilled in the art. Therefore, this invention should be limited only by the claims which follow.

The embodiments of the invention in which an exclusive property or privilege is claimed are defined as follows:

1. In a radio adapted for mounting in a motor vehicle dash, the radio having a case enclosing electronic circuitry including antenna trimmer means having a terminal adapted for connection to an antenna and further having a trimmer adjustment screw, the case having a front plate of electromagnetic shielding material with an opening adapted for access to the trimmer adjustment screw by an adjusting tool from the front of the radio, the improvement comprising, in combination:
   an electrically non-conducting tube extending from the trimmer adjustment screw through the front plate opening, said tube having an inner surface providing access to the trimmer adjustment screw;
   a plurality of electrical contacts within the tube outside the case in front of the front plate, the contacts being circumferentially spaced around and recessed from the tube inner surface and including terminal means projecting outside the tube;
   means for connecting the contact terminal means to selected points of the electronic circuitry;
   at least one additional electrical contact within the tube inside the case behind the front plate, the contact being recessed from the tube inner surface and including terminal means projecting outside the tube and further means electrically connecting said terminal means to the antenna connection terminal, whereby the contact and terminal associated with the antenna connection terminal are electromagnetically separated from the contacts and terminals associated with other parts of the electronic circuitry by the front plate, and whereby the tube is adapted to receive, without removing the radio from the vehicle dash, an adjusting tool for engaging the trimmer adjustment screw without touching the recessed contacts and, alternatively, a test probe with a contact adapted to engage each of the contacts in the tube alternatively by rotation and axial translation through the tube.

2. In a radio adapted for mounting in a motor vehicle dash, the radio having a case enclosing electronic circuitry including antenna trimmer means having an antenna trimmer adjustment screw, the case having a front plate with an opening providing access to the antenna trimmer adjustment screw for an adjusting tool from the front of the radio, the improvement comprising:
   an electrically non-conducting tube extending from the trimmer adjustment screw through the front plate opening, said tube having an inner surface and providing access to the trimmer adjustment screw;
   a plurality of electrical contacts within the tube, the contacts being recessed from the tube inner surface and
   means electrically connecting said contacts to selected points of the electronic circuitry, whereby the tube is adapted to receive, without the radio being removed from the dash, an adjusting tool for engaging the trimmer adjustment screw without touching the recessed contacts and, alternatively, a test probe with a contact adapted to engage each of the contacts in the tube selectively.

* * * * *